United States Patent [19]

Bentley

[11] Patent Number: 5,058,829
[45] Date of Patent: Oct. 22, 1991

[54] SEAT TRACK FITTING

[75] Inventor: Paul R. Bentley, Valley View, Tex.

[73] Assignee: Weber Aircraft, Gainesville, Tex.

[21] Appl. No.: 464,158

[22] Filed: Jan. 12, 1990

[51] Int. Cl.⁵ .............................................. B64D 11/06
[52] U.S. Cl. .............................. 244/122 R; 244/118.6; 410/104; 248/503.1; 403/158
[58] Field of Search ......... 244/122 R, 122 AH, 118.6; 410/101, 102, 104, 15; 248/503, 503.1; 403/147, 154, 158

[56] References Cited

U.S. PATENT DOCUMENTS

| | | | |
|---|---|---|---|
| 3,495,859 | 2/1970 | Hassan | 403/145 |
| 4,139,245 | 2/1979 | McCloskey | 403/149 |
| 4,210,405 | 1/1980 | Jesswein | 403/158 |
| 4,771,969 | 9/1988 | Dowd | 410/105 |
| 4,776,533 | 10/1988 | Sheck et al. | 248/503.1 |

Primary Examiner—Joseph F. Peters, Jr.
Assistant Examiner—Christopher P. Ellis
Attorney, Agent, or Firm—Lyon & Lyon

[57] ABSTRACT

An improved anchor fitting assembly that provides a connecting seat leg member with a degree of freedom of movement thereby allowing for greater load carrying capability. The anchor fitting includes a substantially spherically shaped housing with a bolt-receiving channel therethrough that rotatably engages a bolting member. Also, the anchor fitting is cast as a single-body which makes it relatively simple and economical to construct.

16 Claims, 2 Drawing Sheets

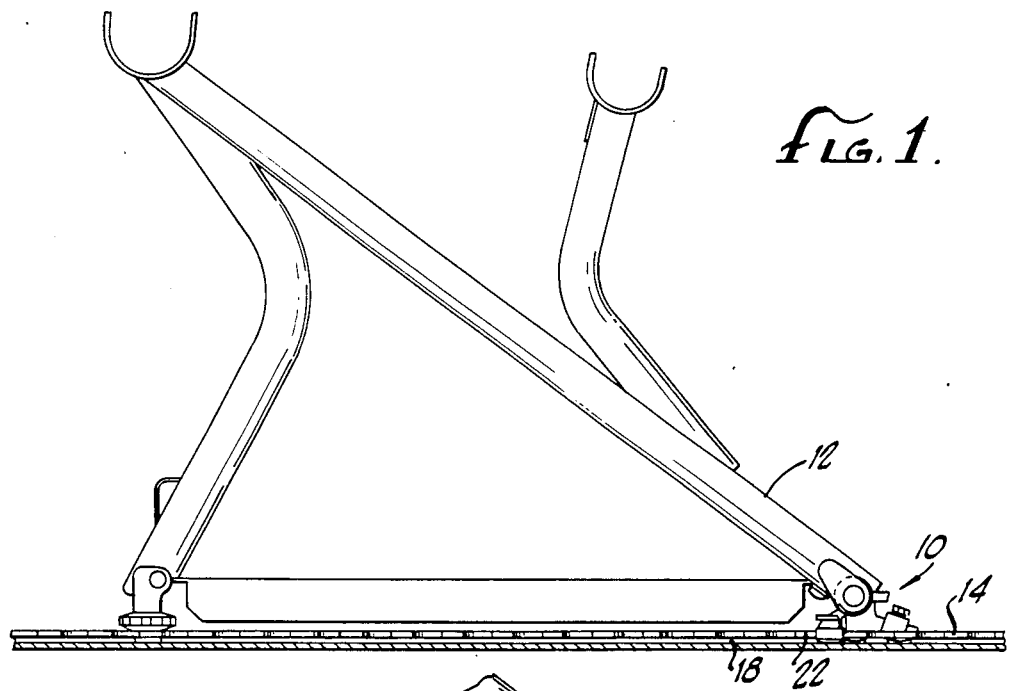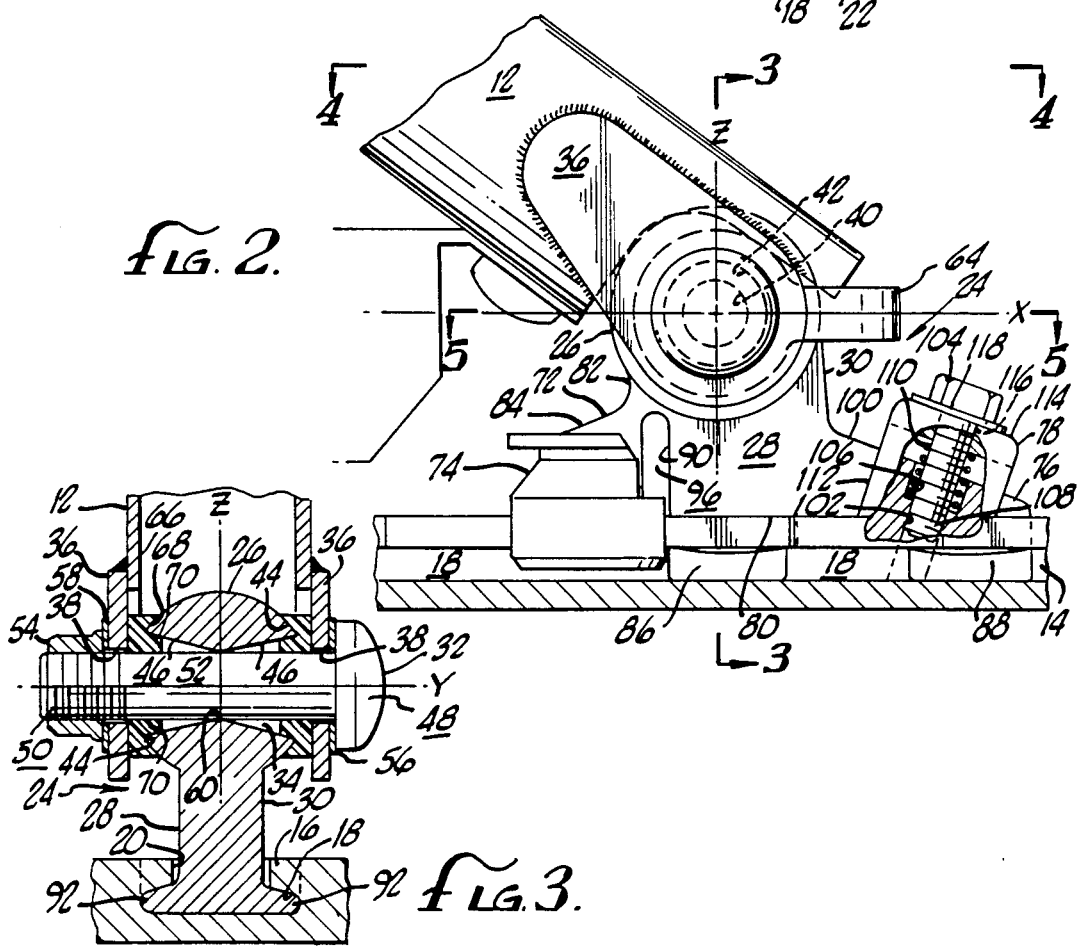

SEAT TRACK FITTING

BACKGROUND OF THE INVENTION

The field of the present invention relates to anchor fitting assemblies for releasably securing aircraft passenger seats and cargo loads to conventional floor mounting tracks and, in particular, to anchor fittings that allow freedom of movement of the connecting seat leg member.

Anchor fittings are utilized by the aircraft industry to secure passenger seats and cargo loads to standard or conventional floor mounting tracks. The tracks have a longitudinally running upwardly opening slot defined by a pair of flanges that interconnect a plurality of evenly spaced circular apertures. The anchor fitting engages the track via a lower portion or track fitting member which has a pair of shoulders that fit into the circular apertures and slide along the slot into an engagement position under the flanges. A blocking member is then placed in the circular aperture to prevent the track fitting from longitudinally sliding into an unlocked position and pulling free from the track. The lower track fitting member is interconnected with an upper portion or seat engagement member which engages the seat leg member or cargo load thereby anchoring the passenger seat or cargo load to the track.

Anchor fittings must be safe, reliable and capable of securing the passenger seat or cargo load under various load conditions. For example, the anchor fitting must be able to secure the passenger seat without breaking or pulling free from the floor track under rough landing or crash conditions which result in substantial forces being applied to the anchor fitting. In addition, it is important that the anchor fitting be relatively simple to install and remove to provide versatility in positioning the passenger seats to provide, for example, first class and coach class accommodations, or to rearrange cargo loads in order to economically utilize the limited space available in the aircraft.

A variety of anchor fittings exist in the prior art. However, many do not provide sufficient load carrying capability or strength to adequately secure passenger seats or cargo loads to the floor tracks under new load carrying requirements. One type of anchor fitting that has been designed to withstand greater load requirements allows the connecting seat leg member a certain degree of freedom of movement while it is connected to the anchor fitting. However, the anchor fittings that allow this freedom of movement require multiple parts and are, therefore, expensive and difficult to construct.

SUMMARY OF THE INVENTION

The present invention is directed to an improved anchor fitting assembly that allows freedom of movement of the connecting seat leg member, is able to meet the new load carrying requirements and is simple and economical to construct.

Accordingly, it is an object of the present invention to provide an anchor fitting having a one-piece body formed to include a substantially spherically shaped seat engagement housing connected to a track fitting member. The housing defines a bolt-receiving channel therethrough that engages a bolting member utilized to secure the seat leg member to the anchor fitting. The bolting member and bolt-receiving channel interact to allow the bolting member to rock, pivot and/or rotate in the channel. Other and further objects and advantages will appear hereinafter.

BRIEF DESCRIPTION OF THE DRAWINGS

FIG. 1 illustrates the anchor fitting assembly securing the leg of a passenger seat to the floor track.

FIG. 2 is an enlarged drawing illustrating the anchor fitting assembly of FIG. 1 securing the leg of a passenger seat to the floor track.

FIG. 3 is a cross-section of the anchor fitting assembly along lines 3—3 in FIG. 2.

DETAILED DESCRIPTION OF THE PREFERRED EMBODIMENT

Figure 4:
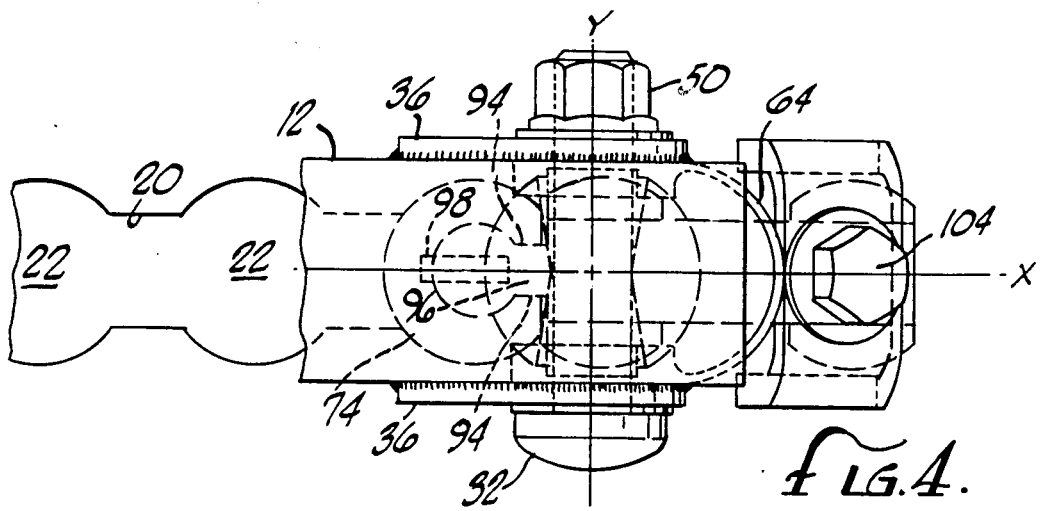
FIG. 4 is a plan view of the anchor fitting assembly in FIG. 1.

Turning in detail to the drawings, FIG. 1 illustrates an aircraft passenger seat anchor fitting assembly 10 anchoring or securing a seat leg member 12 to a conventional floor track 14 of the type utilized in the aircraft industry. The floor track 14 has a pair of track flanges 18 on opposite sides of an inverted T-shaped channel 18 thereby defining an upwardly opening slot 20. The channel 18 and slot 20 run longitudinally along the length of the track 14 interconnecting a plurality of evenly spaced openings 22 located thereon (FIG. 4).

The anchor fitting assembly 10 includes an anchor body 24 constructed or cast of heat treated alloy steel or other suitable material capable of withstanding large forces. The anchor body 24 is cast as a single body comprising a spherical head portion or housing 26 for supporting the seat leg member 12 integrally formed with a foot-shaped lower portion or track engagement member 28 for securing the anchor body 24 to the floor track 14.

The housing 26 of the anchor body 24 is integrally formed with the track engagement member 28 via a vertical post 30 and engages the seat leg member 12 by means of a horizontally disposed seat engagement bolt 32 which passes through and is slidably received by a bolt-receiving channel 34 in the housing 26 and a pair of parallel seat leg retaining branches 36 having horizontally aligned bolt apertures 38. The bolt-receiving channel 34 passes completely through the housing 26 and is circular in cross-section but tapered inwardly from either end such that a minimum channel diameter 40 is formed at or near the center of the housing 36 and maximum channel diameters 42 are formed at respective openings 44 in the channel 34.

Figure 5:
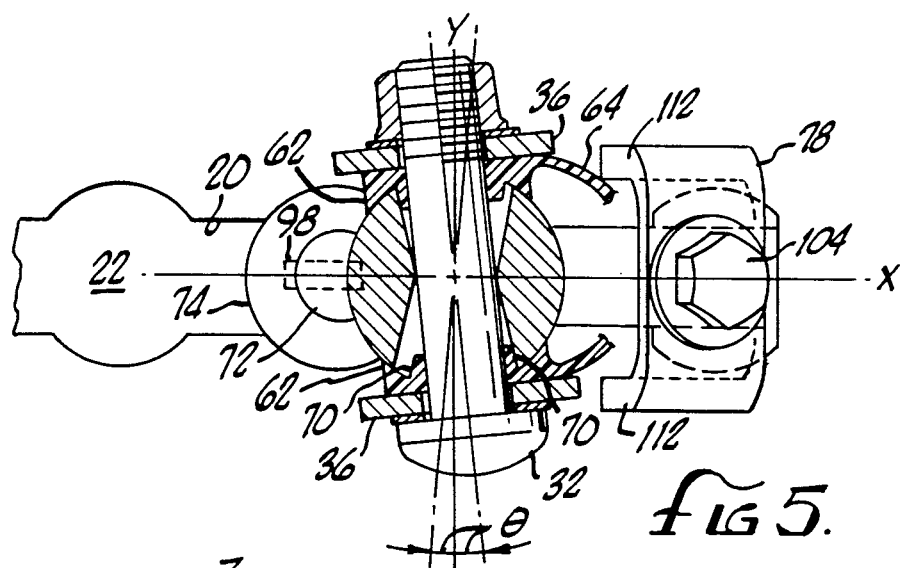
FIG. 5 is a cross-sectional plan view of the anchor fitting assembly along lines 5—5 in FIG. 2 and also shows the rotation of the seat leg engagement bolt about the Z-axis.
Figure 6:
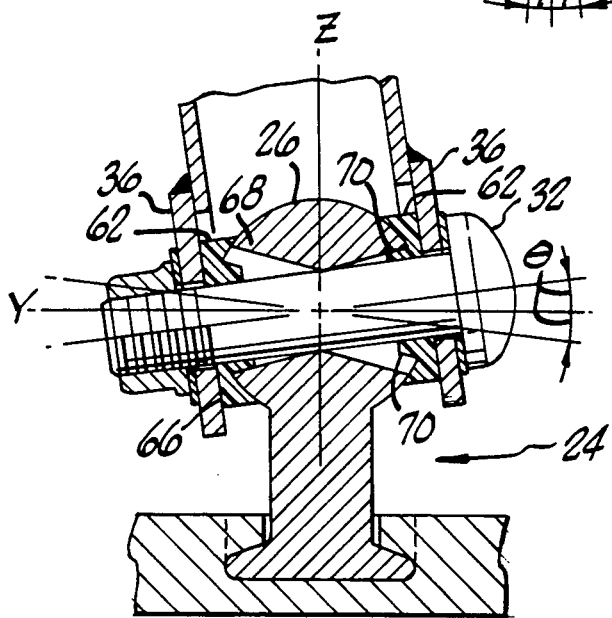
FIG. 6 is a cross-sectional view of the anchor assembly showing the rotation of the seat leg engagement bolt about the X-axis.

As illustrated in FIGS. 3-6, the X- Y- and Z-axes run through the center of the spherically shaped housing 26 such that the walls of the conically shaped sections slope Θ degrees from the center axes of the housing 26 toward the openings 44 in the channel 34 wherein Θ is 10 degrees. Thus, as illustrated in FIGS. 3 and 6, the bolt receiving channel 34 is comprised of two conically shaped sections 46, one on either side of the Z-axis, sharing the minimum channel diameter 40. The Y-axis is horizontally positioned along the center axis of the circular cross-section of the bolt receiving channel 34 while the Z-axis runs vertically through the minimum channel diameter 40. Finally, the illustrated embodiment utilizes a value of Θ equal to 10 degrees. However, this value may, of course, be varied.

The seat engagement bolt 32 is a straight bolt constructed of heat treated alloy steel or other suitable material having a bolt head 48, a threaded portion 50 at the end opposite the bolt head 48 and a smooth mid-portion 52 for slidable engagement with the bolt-receiving channel 34 there between. The Y-axis passes through the rotating axis of the seat engagement bolt 32 when the seat engagement bolt 32 is in a horizontal position in the bolt receiving channel 34 (FIG. 3). A bolt nut 54 secures the bolt 32 to the seat leg retaining branches 36 and housing 26. A first washer 56 is sandwiched between the bolt head 48 and seat leg branch 36 while a second washer 58 is sandwiched between the bolt nut 54 and seat leg branch 36.

The width of the minimum channel diameter 40 is slightly larger than the diameter of the seat engagement bolt 32 and provides a bolt rest 60 that allows the bolt 32 to rock, pivot or sway thereon in a number of directions. Similarly, the bolt 32 is provided with a degree of freedom to rotate about an infinite number of axes passing through the center of the spherical housing 26. Consequently, the inter-relationship of the bolt 32 with the housing 26 and tapered channel 34 allows the seat leg member 12 a substantial degree of freedom to move even under very high load conditions. For example, as illustrated in FIGS. 5 and 6, the seat engagement bolt 32 is allowed to rotate about the Z- and X-axes, respectively, a distance of Θ degrees. Furthermore, the spherical shape of the housing 26 permits substantial rotation of the seat leg member 12 about the housing 26 without concern about the seat leg branches 36 impinging against the housing 26 and thereby damaging either the housing 26 or the seat leg branches 36 by, for example, snapping off one of the seat leg branches 36. Thus, the anchor fittings assembly 10 is capable of securing substantial loads to a floor track 14 without breaking. Although the housing 26 in the illustrated embodiment is substantially spherically shaped the housing 26 may be constructed of other suitable shapes that will allow the seat leg branches 36 and housing 26 to interact without the seat leg branches 36 impinging into the housing 30.

A pair of particularly shaped nylon bushings 62 are provided to prevent movement in any direction, except rotation about the Y—Y axis, under normal load conditions. The two nylon bushings 62 are integrally formed with and interconnected to a bushing strip 64. Each nylon bushing 62 has a flat side 66 which is positioned against the leg branch 36 and a concave side 68 shaped to the configuration of and positioned against the outside surface of the housing 26. Each concave side 68 further provides an annular stop 70 that protrudes a short distance into and fills the channel openings 44 and rest on and around the surface of the seat engagement bolt 32, as shown in FIG. 3. These stops 70 serve to prevent vibration and pivoting movement between leg 12 and anchor body 24 under normal load conditions. Stops will extrude temporarily from between the bolt 32 and sections 46, as shown in FIGS. 5 and 6, when leg 12 is pivoted about the X—X or Z—Z axes as a result of high loads, thereby allowing the desired freedom of movement when necessary but normally maintaining the leg 12 in the neutral, unpivoted position.

The lower portion 28 of the anchor body 24 has a cylindrically shaped plunger post 72 located at one end of the lower portion 28 for slidably mounting a shear plunger 74, a bracket section 76 located at the other end of the lower portion 28 for securing an anti-rattle bracket 78, the vertical post 30 located therebetween, and a base or support surface 80 in contact with the floor track 14. The plunger post 72 has a plunger neck portion 82 which connects the plunger post 72 to the anchor body 24 and a straight upper surface 84 normal to the maximum diameter 42 of bolt receiving channel 34.

The support surface 80 includes a first track engagement pad 86 which is vertically displaced below the housing 26 along a vertical post wall 90 such that the vertical post wall 90 and first pad 86 are normal to the maximum diameter 42 of the bolt receiving channel 34 and a second track engagement pad 88 positioned below the bracket section 76 (FIG. 2). The first track pad 86 and second track pad 88 have shoulders 92 which are sized and shaped to conform to the cross-section of the channel 18 in the track 14. The shoulders 92 in the channel 18 are retained against upward displacement by the overlying track flanges 16 of the track 14. As illustrated in FIG. 3, the width of the lower portion 28 of the anchor body 24 is narrower than the track slot 20 and permits longitudinal displacement of the anchor body 24 within the track when the shoulders 92 are located in the track channel 18.

As illustrated in FIGS. 2 and 4, the shear plunger 74 is a C-shaped cylindrical member having a pair of end portions 94. The shear plunger 74 is mounted for slidable vertical displacement along the plunger post 72 such that the end portions 94 are slidably secured within a plunger guide 96 formed between the plunger post 72 and vertical post 30. The shear plunger 74 may be vertically displaced along the plunger post 72 and guide 96 between an upper unlocked position and a lower locked position. A spring loaded pin 98 is provided to retain the shear plunger 74 in position. The dimensions of the various elements are selected so that the shear plunger 74 in its lower position engage the track openings 22 to prevent longitudinal motion of the anchor body 24 along the track 14. In this position the anchor body 24 is retained such that the pads 87, 88 and track openings 22 are not aligned and the pad shoulders 92 and track flanges 178 are inter-engaged. The plunger 74 will hold the anchor body 24 in correct position during all forward, aft and side loads placed on the anchor body 24. A more detailed explanation of the shear plunger 74 is provided in U.S. Pat. No. 3,705,735 which is hereby incorporated by reference in its entirety.

The bracket section 78 is horizontally displaced to the opposite end of the anchor body 24 relative to the plunger post 72 and extends outwardly and tapers downwardly from the vertical post 30 to produce a slanted flat upper surface 100 located above the second pad 88 for securing a bracket bolt 104. A bracket channel 102 is drilled through the bracket section 76 substantially perpendicular to the slanted upper surface 100 to provide an unthreaded first cylindrical bore 106 coaxially aligned with a threaded second cylindrical bore 108. The first bore 106 has a larger diameter relative to the second bore 108 to provide a support area for a bracket spring 110. The second bore 108 is threaded to engage with an allow the bracket bolt 104 to rotate into the bracket section 76 and secure the anti-rattle bracket 78 thereto.

As illustrated in FIGS. 2 and 5, the bracket 78 is a U-shaped member having a pair of parallel leg supports 112 connected via a bracket face 114 having a bolt hole 116 therethrough. The leg supports 112 rest on opposite sides of the bracket section 76 positioning the bracket face 114 such that the bolt hole 116 is coaxially aligned with a bracket washer 118, sandwiched between the bracket bolt 104 and bracket face 114, and the bore holes 106, 108. The bracket bolt 114 passes through the bracket washer 118, bracket face 114, spring 110 and bracket section 76 and is threaded into contact with the base of the track channel 20 thereby applying a force to lift the pads 86, 88 into firm engagement with the under surface of the track flanges 16. Thus, the bracket bolt 114 prevents loose fitting and rattling and related noise that may result from the vibrations of the aircraft. Finally, it should be noted that although the anchor fitting assembly is described with particular reference to aircraft utilization the anchor fitting assembly is also applicable to other vehicles such as vans, cargo moving trucks, trains, ships and so forth.

Thus, an improved anchor fitting assembly is disclosed which allows a connecting seat leg member substantial freedom of movement and has a greater load carrying capability than prior art fittings. Furthermore, an anchor fitting assembly is disclosed which includes a main body of one-piece construction which is relatively simple and economical to construct. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An anchor fitting for anchoring a leg member having a pair of spaced branches with facing vertical surfaces to a track having a slot comprising:
    a body member having means for anchoring engagement with the track slot and a vertical post at a distal end of said body member, said vertical post for positioning between the spaced branches of the leg member and having a horizontal bolt-receiving channel therethrough with a rest portion for rocking engagement with a bolt extending through the bolt-receiving channel and the spaced branches.
    said bolt-receiving channel having a first inwardly tapered section on one end and a second inwardly tapered section on the other end such that said first and second sections contain respective outside diameters larger than a shared inside diameter at the rest portion,
    said vertical post having a substantially spherical outer surface surrounding each tapered section of said bolt-receiving channel for positioning between the facing vertical surfaces on the spaced branches of said leg member with a small gap between each said vertical surface and the adjacent spherical outer surface of the vertical post,
    a bushing provided at each end of said bolt-receiving channel in and filling said gap for engaging a said vertical surface and slidably engaging the spherical outer surface surrounding that tapered section on the vertical post for allowing pivotal movement of the leg member relative to the vertical post in all directions without linear movement therebetween.

2. An anchor fitting as claimed in claim 1, wherein said bushings are mounted on said bolt, and said bolt has a central portion of a diameter substantially equal to said shared inside diameter of said tapered sections.

3. An anchor fitting as claimed in claim 1, wherein said body member is a single-piece having an upper portion integrally formed with a lower portion, said upper portion comprising the vertical post, and
    said lower portion comprising a forward section for engagement with a first retaining means for retaining said body member in an anchored position in said track, a rear section positioned behind said forward section for engagement with a second retaining means for securing said body member to said track, a first track engaging means and a second track engaging means for slidably anchoring said body member on track engaging means for slidably anchoring said body member to the track slot, wherein said first track engaging means is located below said rear section and said second track engaging means is located between said forward section and said rear section normal to said outside diameter.

4. An anchor fitting as claimed in claim 1, wherein the vertical post is integrally formed at the upper end of a track engagement member,
    said track engagement member being formed to provide a base portion that tapers outwardly from an upper end of the track engagement member to define a rear section, a forward section formed from said upper end of the track engagement member positioned opposite said rear section, and a first and second T-shaped tab protruding from the base portion for anchoring engagement with a track;
    a restraining mechanism mounted to said track engagement member for restraining said track engagement member from longitudinally sliding from a locked position on the track to an unlocked position on the track; and
    a securing mechanism mounted to said track engagement member for biasing said T-shaped tabs upwardly into a tight fitting position within the track.

5. An anchor fitting as claimed in claim 1 wherein each said bushing has a concave side for engagement with said vertical post, a flat side for engagement with said vertical surfaces of the branches of the leg member and a stopping member which protrudes into each tapered section of the bolt-receiving channel.

6. An anchor fitting as claimed in claim 5, wherein the stopping member is of an annular shape and length to fill an outer portion of the space between the tapered section and the bolt.

7. An anchor fitting as claimed in claim 6, wherein said bushings are formed of an elastomer for said stopping member to be elastically deformed by pivotal movement of the leg member relative to the vertical post tending to misalign the bolt and bolt-receiving channel.

8. An anchor fitting as claimed in claim 1, wherein the bushings are formed of a low-friction material for minimizing resistance to the pivotal movement between the leg member and the vertical post.

9. An anchor fitting as claimed in claim 8, wherein the material of the bushings is an elastomer to allow elastic deformation thereof upon the occurrence of substantial pivotal or linear movement between the leg member and the vertical post.

10. An anchor fitting for anchoring a leg member having a pair of spaced branches with facing vertical surfaces to a track having a slot, a body member having means for anchoring engagement with the track slot and a vertical post at a distal end of said body member, said vertical post for position between the spaced branches of the leg member and having a horizontal bolt-receiving channel therethrough with a rest portion for rocking engagement with a bolting member extending through the bolt-receiving channel and the spaced branches, said bolt-receiving channel having a first inwardly tapered section and a second inwardly tapered section such that said first and second section contain respective outside diameters larger than a shared inside diameter at the rest portion, said vertical post having a substantially spherical outer surface surrounding each tapered section of said bolt-receiving channel for positioning between the facing vertical surfaces on the spaced branches of said leg member with a small gap between each said vertical surface and the adjacent spherical outer surface of the vertical post, the improvement comprising:

a bushing provided at each end of said bolt-receiving channel in and filling said gap for engaging a said vertical surface an slidably engaging the spherical outer surface surrounding that tapered section on the vertical post for allowing pivotal movement of the leg member relative to the vertical post in all directions without linear movement therebetween.

11. An anchor fitting as claimed in claim 10, wherein said bushings are mounted on said bolt, and said bolt has a central portion of a diameter substantially equal to said shared inside diameter.

12. An anchor fitting as claimed in claim 10, wherein each said bushing has a stopping member which protrudes into the tapered section of the bolt receiving channel.

13. An anchor fitting as claimed in claim 12, wherein the stopping member is of an annular shape and length to fill an outer portion of the space between the tapered section and the bolt.

14. An anchor fitting as claimed in claim 13, wherein said bushings are formed of an elastomer for said stopping members to be elastically deformed by pivotal movement of the leg member relative to the vertical post tending to misalign the bolt and bolt-receiving channel.

15. An anchor fitting as claimed in claim 10, wherein the bushings are formed of a low-friction material for minimizing resistance to the pivotal movement between the leg member and the vertical post.

16. An anchor fitting as claimed in claim 15, wherein the material of the bushings is an elastomer to allow elastic deformation thereof upon the occurrence of substantial pivotal or linear movement between the leg member and the vertical post.

* * * * *